Figure 1:
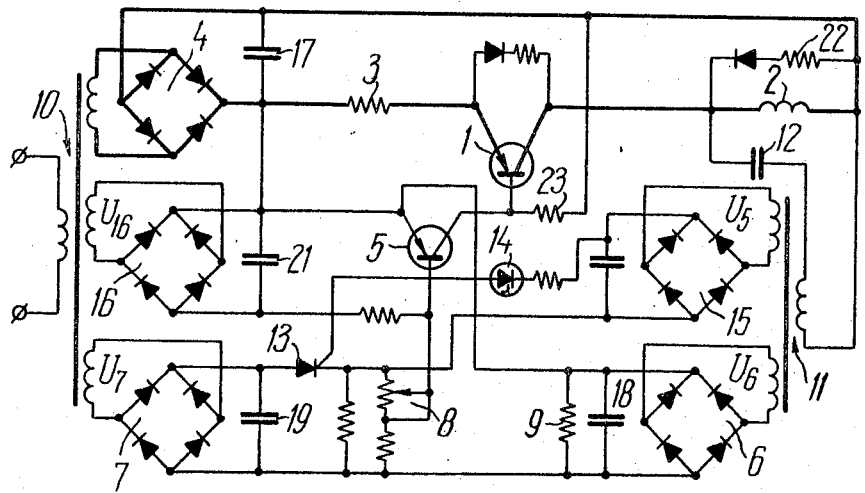

United States Patent [19]
Glukhov et al.

[11] 3,818,294
[45] June 18, 1974

[54] DEVICE FOR INDUCTION STARTING A SYNCHRONOUS MOTOR AND PULLING IT INTO SYNCHRONISM

[76] Inventors: Vasily Pavlovich Glukhov, ulitsa Raunas, 43, kv. 37; Valery Andreevich Maiorov, ulitsa Menes, 10, kv. 23; Alexandr Alexandrovich Sviridov, ulitsa Kirova, 10, kv. 2, all of Riga, U.S.S.R.

[22] Filed: Feb. 13, 1973

[21] Appl. No.: 332,193

[52] U.S. Cl. ............... 318/174, 318/176, 318/181, 318/183, 318/193
[51] Int. Cl. ............................................. H02p 1/46
[58] Field of Search ........... 318/167, 174, 176, 181, 318/183, 193

[56] References Cited
UNITED STATES PATENTS
| | | | |
|---|---|---|---|
| 3,350,613 | 10/1967 | Brockman et al. | 318/193 X |
| 3,354,368 | 11/1967 | Williamson | 318/193 X |
| 3,405,338 | 10/1968 | Frola | 318/193 X |

Primary Examiner—Gene Z. Rubinson
Attorney, Agent, or Firm—Waters, Roditi, Schwartz & Nisson

[57] ABSTRACT

The present invention relates to a device for induction starting and pulling into synchronism of a synchronous motor.

The device, comprising in the motor field winding and connected to the power mains a rectifying bridge and a semiconductor triode, controlled by another semiconductor triode, to the emitter-base junction of which are connected two rectifying bridges comprising a comparison circuit, one of said bridges generating a voltage proportional to the slippage e.m.f., while the other bridge, a voltage proportional to the mains e.m.f. The comparison circuit includes a controlled diode, tripping with high rotor slippage speeds the voltage circuit proportional to the mains e.m.f, and a Zener diode is connected to the control electrode of this diode for energizing the latter at the required moment.

3 Claims, 2 Drawing Figures

DEVICE FOR INDUCTION STARTING A SYNCHRONOUS MOTOR AND PULLING IT INTO SYNCHRONISM

The present invention relates to automatic control devices of electric machines, and more particularly, to devices for induction starting a synchronous motor and pulling it into synchronism.

Known in the art are devices for controlling synchronous electric motors in the induction duty, in which the principal signal enabling to determine the rotor speed is the slippage e.m.f. induced in the field winding.

As a power source for such devices and for the motor field winding there is used a control winding disposed in conjunction with the field winding, and a supplementary stator winding. Such devices can be used for controlling the motors, in which with different values of slippage S, different values of e.m.f.E. are induced in the field winding (curve A in FIG. 1), in the induction duty. The moment of functioning of the control devices is determined by a certain critical value of e.m.f. $E_1$ induced in the field winding at such a value of slippage $S_1$, with which the motor pulls into step. Within the region of slippage alteration 1.0　　S>$S_1$ (E>$E_1$) the field winding is disconnected from the power source by the control device and is shorted to a shunting resistance, while in the region $S_1$　　S　O (E　$E_1$) it is connected to the power source.

Meanwhile, a number of synchronous motors have powerful damper cages in order to improve their starting characteristics. The presence of a powerful damper cage cuts down sharply at the initial starting period of the motor start-up, the longitudinal component of the magnetic flux, coupled with the field winding, owing to which an insignificant e.m.f. is induced in the latter with high slippages of the rotor. FIG. 1 (curve B) shows as an example an e.m.f. curve of the motor slippage employing a powerful damper cage. In this case with two various values of slippage $S_1$ and $S_2$ one and the same e.m.f. $E_1$ is induced in the field winding, and hence, one more regions of slippage alteration is available 1.0　　24 S　　S, wherein is induced in the field winding e.m.f. E　$E_1$. Naturally, during the motor start-up, a misoperation of the control device will follow in this region, as a result of which the motor will fail to pull in to step.

It is an object of the present invention to alleviate the foregoing difficulties.

It is herein contemplated that there shall be provided a device for induction starting and pulling into synchronism of a synchronous motor making possible to control the synchronous motor in the induction duty, whose e.m.fs of the field winding having one and the same value $E_1$ with two various slippage values $S_1$ and $S_2$.

This object is attained in a device for induction starting and pulling into synchronism of a synchronous motor comprising, in the field winding circuit and connected to a power mains, a rectifying bridge and a semiconductor triode, controlled by another semiconductor triode, to whose emitter base junction are connected two rectifying bridges utilizing a comparison circuit, one of said bridges supplying a voltage proportional to the slippage e.m.f., while the other, a voltage proportional to the power mains e.m.f., wherein according to the invention, the circuit of said comparison circuit includes a controlled diode, which breaks with high rotor slippage the voltage circuit proportional to the power mains e.m.f., and to the control electrode of said diode is connected, in order to energize it at the required time, a Zener diode, supplied from a supplementary rectifying bridge, supplying another voltage which is likewise proportional to the rotor slippage e.m.f.

It is advantageous that an additional rectifying bridge supplied from the mains and supplying the voltage proportional to the power mains e.m.f. is included into the circuit of the emiter-base junction of the semiconductor triode controlled by the semiconductor triode in the field winding circuit. This step is necessary for making said triode conducting in case the control pulse derived from the triode is insufficient for making the triode conducting with high rotor slippages.

Figure 2:
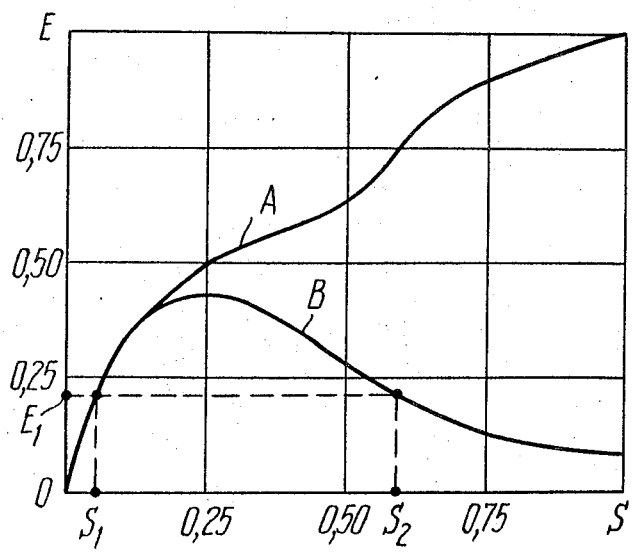

A fuller understanding of the nature of the invention will be had from the following detailed description taken in conjunction with the accompanying drawings, wherein:

FIG. 1 is a schematic circuit diagram of the device, according to the invention; and FIG. 2 shows slippage e.m.f. curves of synchronous motors.

As can be seen in FIG. 1, the device hereinabove described for induction starting for pulling into synchronism a synchronous motor comprises a semiconductor triode (transistor 1) whose collector is connected into the circuit of the motor field winding 2, while the emitter is connected to the positive pole of a rectifying bridge 4 via a resistor 3; to the base of the transistor 1 is connected the collector of another semiconductor triode (transistor 5) to whose emitter-base junction are connected two rectifying bridges 6 and 7 and a comparison circuit utilizing resistors 8 and 9.

Rectifying bridges 4 and 7 are supplied from secondary windings of a transformer 10, whose primary winding is energized with line voltage of the mains feeding the synchronous electric motor, while rectifying bridge 6 is supplied from the secondary winding of a transformer 11, the primary winding thereof being connected in parallel to the motor field winding 2 via a capacitor 12.

Thus the rectifying bridge 6 generates voltage $U_6$, proportional to the rotor slippage e.m.f. while the rectifying bridge 7 generates voltage $U_7$, proportional to the mains e.m.f.

The comparison circuit utilizing resistors 8 and 9 includes a controlled diode 13 connected a Zener diode 14 supplied from a rectifying bridge 15. The latter bridge 15 is supplied from another secondary winding of the transformer 11 and generates voltage $U_{15}$, proportional to the slippage e.m.f.

To preclude the transistor 5 from becoming non-conducting (due to a low-level control signal across it), its emitter-base junction circuit includes an additional rectifying bridge 16, connected to one of the secondary windings of the transformer 10 and generating voltage $U_{16}$, proportional to the mains e.m.f. For smoothing out the rectified voltage, capacitors 17, 18, 19, 20, 21 are connected in parallel to the rectifying bridges 4, 6, 7, 15, 16 respectively.

Transistor 1 is used as the principal component which deenergizes the circuit of the field winding 2. The switching circuit of the transistors 1 and 5 is such that the transistor 1 is conducting when the transistor 5 is non-conducting, and vice versa.

The operation of the device is based on the comparison principle of the voltages $U_6$ and $U_7$. These voltages are compared at the emitter-base junction of the transistor 5.

The device is switched on using the controlled diode 13, which cuts off the voltage supply to the comparison circuit with high rotor slippage speeds.

The transistor 5 becomes conducting in this case by the voltage $U_{16}$ applied to the emitter-base junction of said transistor. The voltage $U_7$ is applied to the comparison circuit only in case the voltage $U_{15}$ attains a value necessary for puncturing the Zener diode 14.

Thus, in order to exclude mis-operation at high rotor slippage speeds, the device described provides for a triggering circuit controlled by rectified voltage $U_{15}$ derived from the rectifying bridge 15, which at starting of the motor with the help of the diode 13 switches on the device only in the slippage region $S_2 > S > S_1$, i.e. when the e.m.f. induced in the field winding 2 exceeds the peak value of e.m.f. $E_1$. To provide for the conduction condition of the transistor 5 (FIG. 1) at high rotor slippage speeds, rectified voltage $U_{16}$ derived from the rectifying bridge 16 is used.

During the induction starting the device operates as follows.

The synchronous motor is started with simultaneous application of the voltage to its stator winding (not shown in the FIG.) and the primary winding of the transformer 10. At low rotational speed of the rotor in the field winding 2 is induced a small slippage e.m.f. The comparison circuit is blocked with the controlled diode 13. Under the action of the voltage $U_{16}$ the transistor 5 becomes fully conducting, owing to which the transistor 1 is non-conducting. The slippage value at the field winding 2 is shunted by resistors 22 and 23.

As the voltage $U_{15}$ reaches a value sufficient for the puncture of the Zener diode 14 (slippage region $S_2 S S_1$) to the control electrode of the diode 13 is supplied a signal to make it conducting. The comparison circuit becomes unblocked and starts its normal operation. During the whole period of the induction starting of the motor, conditions for making the transistors 5 conducting are ensured, owing to the selection of the voltages $U_7$ and $U_6$ and resistors 8 and 9.

With the rotor achieving a speed near synchronous' the e.m.f. induced in the field winding 2 drops sharply. This causes the voltage across the capacitor 18, and hence across the transistor 5 emitter to decrease. As the voltage $U_6$ attains a value less than the peak value (slippage region $S_1 > S > 0$), there is produced across the emitter-collector junction of the transistor 5 is a voltage drop, which reduces the potential across the transistor 1 base. As the potential attains a value less than that across the transistor 1 emitter, the latter transistor starts boosting. The value of the constant current component increases in the field winding 2 and the motor pulls into step.

With the motor falling out of step the device operates as follows.

The falling out of step of the motor is accompanied by a sharp build up of the stator current and e.m.f. across the field winding, which, in turn, causes a rapid rise of voltage across the insulation of the capacitor 18. The rise of voltage $U_6$ makes the transistor 5 conducting, and hence, the transistor 1 non-conducting, and hence, the voltage across its emitter-collector junction increases and the motor excitation current decreases.

The drop of constant component in the field winding reduces the stator current and voltage flowing through its control winding. The capacitor 18 becomes discharging. A constant component arises in the excitation current and the device starts operating in the induction duty.

What is claimed is:

1. A device for effecting induction starting and resynchronizing of contactless synchronous motors having fixed armature and excitation windings, said device comprising: a transformer whose primary winding is connected to the supply source of the motor stator, a semiconductor rectifier connected on the alternating-current side thereof to the secondary winding of said transformer, a transistor, the direct-current side of said rectifier being connected via the emitter-collector junction of said transistor to the excitation winding; said transformer being adapted for inducing a certain voltage value in the excitation circuit, and for providing galvanically decoupled, d-c circuits; said transistor having its base connected via a resistor to the negative voltage terminal of the excitation circuit, the parameters of the transistor and its circuits being selected such that with the negative sign of the slippage e.m.f. at the end of the excitation winding, which is connected to the negative terminal of a power supply rectifier, the transistor operates in a saturation mode when inversely connected, thus providing, via a collector-base junction, a closed circuit for shunting the excitation winding with a resistor per half-period of the slippage e.m.f. and a desirable phase of switching-in the main excitation circuit; means for controlling said transistor comprising a second transistor, a circuit for comparing a stabilized d-c voltage on the emitter-base junction of the second transistor, said voltage being obtained at the output terminal of a third rectifier whose a-c side is connected to another secondary winding of said transformer, and a d-c voltage obtainable on the output terminal of a fourth rectifier which is connected, on the a-c side, to the secondary winding of another transformer whose primary winding is connected via a capacitor to the output terminals of the excitation winding, the parameters of the circuits of the both voltages to be compared being selected such that the current ceases the flow through the emitter-base junction of the second transistor at a preset value of the second voltage corresponding, under any load of a motor, to the rotational speeds of a rotor at which, on closing the main excitation circuit, the motor may be pulled into synchronism; said second transistor being so connected that, where there is no emitter-collector current flowing, conditions are provided to close the emitter-collector junction of the first transistor, whereas when current is flowing, there are provided conditions for opening the emitter-collector junction of the first transistor; said second transformer being adapted for providing galvanically decoupled, d-c electric circuits with voltages that are proportional to the slippage e.m.f. induced in the excitation winding.

2. A device as claimed in claim 1, further comprising means for interrupting the comparison circuit, including a controllable valve connected to the stabilized-voltage circuit, and a circuit for controlling said valve which comprises a stabilitron, the d-c voltage source including a rectifier which is connected on its d-c side to another secondary winding of the second transformer, for those contactless synchronous motors that have the same mean value of the slippage e.m.f., at which conditions are provided for closing the main circuit of the excitation winding, with two different rotational speeds of the rotor, the parameters of the control circuits being selected such that the controllable valve connects the comparison circuit for normal operation only after the rotor has a slippage value which is smaller than that at which the mean value of the slippage e.m.f. is equal to the aforementioned one.

3. A device as claimed in claim 2, further comprising a circuit for opening the second transistor at a large amount of slippage comprising a rectifier in the third secondary winding of the first transformer, and a resistor which is active when the slippage e.m.f. at low rotational speeds of the rotor is insufficient for reliably opening the second transistor.

* * * * *